United States Patent [19]

Takahashi et al.

[11] Patent Number: 5,281,472
[45] Date of Patent: Jan. 25, 1994

[54] SURFACE-TREATED POLYESTER FILM

[75] Inventors: Teruo Takahashi, Hachioji; Toshiya Koyama, Utsunomiya; Sadayoshi Miura, Yamato, all of Japan

[73] Assignee: Teijin Limited, Osaka, Japan

[21] Appl. No.: 815,744

[22] Filed: Jan. 2, 1992

Related U.S. Application Data

[63] Continuation-in-part of Ser. No. 593,015, Oct. 4, 1990, abandoned.

[30] Foreign Application Priority Data

Oct. 5, 1989 [JP] Japan .................. 1-258884

[51] Int. Cl.$^5$ .................. B32B 27/36; B32B 27/40
[52] U.S. Cl. .................. 428/336; 428/413; 428/423.1; 428/423.7; 428/480; 428/910; 428/922
[58] Field of Search .................. 428/336, 413, 423.1, 428/423.7, 480, 910, 922; 524/392; 525/407, 438, 440, 453, 454

[56] References Cited

U.S. PATENT DOCUMENTS 4,755,337  7/1988  Takahashi et al. .................. 264/134

FOREIGN PATENT DOCUMENTS 1-038235  2/1989  Japan .
63-54037  10/1989  Japan .

*Primary Examiner*—Paul J. Thibodeau
*Assistant Examiner*—D. S. Nakarani
*Attorney, Agent, or Firm*—Wenderoth, Lind & Ponack

[57] ABSTRACT

A polyester film having on at least one side, a primer layer comprising a crosslinked product between (a) a polyurethane having $(0.22-33) \times 10^{-4}$ gram equivalent/gram of resin, of at least one functional group selected from a carboxyl group and a salt group derived therefrom and (b) a polyepoxy compound, said crosslinked product containing (c) an antistatic agent composed mainly of a compound represented by the following general formula (I)

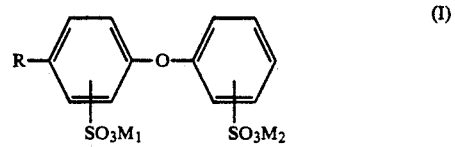

wherein R represents an alkyl group of 4–20 carbon atoms, and $M_1$ and $M_2$ each represent an alkali metal ion, an ammonium group or a tertiary amino group, as well as a process for producing said film. The film is useful as a base material for highly processed polyester film products such as magnetic tape, floppy disc, X-ray photographic film, telephone card, OHP, base for printing plate and the like.

8 Claims, No Drawings

SURFACE-TREATED POLYESTER FILM

CROSS REFERENCE TO RELATED APPLICATION

This application is a continuation-in-part application of U.S. Patent Application Ser. No. 07/593,015 filed Oct. 4, 1990 now abandoned.

BACKGROUND OF THE INVENTION

The present invention relates to a surface-treated polyester film. More particularly, the present invention relates to a coated polyester film having excellent antistatic property, adhesivity and solvent resistance, useful as a base material for highly processed polyester film products such as magnetic tape, floppy disc, X-ray photographic film, telephone card, OHP, base for printing plate and the like, as well as to a process for producing said film.

A biaxially stretched polyester film, particularly a biaxially stretched polyethylene terephthalate film has excellent mechanical properties, heat resistance, chemical resistance, etc. and is used as a base material for magnetic tape, photographic film, wrapping film, metallized film for capacitor, electrical insulating film, OHP film, etc. The recent growth in demand for said film is very striking. The polyester film, however, has drawbacks in that since the surface is highly crystallized and oriented, the film shows high surface cohesivity and poor adhesivity to various coatings.

Hence, in order to improve the surface adhesivity of the polyester film, it is known to employ various means, for example, a corona treatment, a plasma treatment and a flame treatment. These means, however, have a drawback in that the effect imparted thereby is reduced with the lapse of time.

As a means for eliminating the above drawback, a treatment by chemical agent is mentioned. This means, however, is disadvantageous in practical application because the chemical agent is toxic and the vapor generated therefrom causes environmental pollution.

As another means, it is known to coat a coating agent on a biaxially stretched polyester film to form a primer layer of good adhesivity on the film. However, this means also has safety and hygiene problems such as deterioration of environment by vaporization of the organic solvent used in the coating agent, and further has a fear that surface defects are frequently generated as a result of dust deposition because the coating environment is dirty.

Accordingly, if the formation of a primer layer on a polyester film is made during the step of producing the polyester film by using an aqueous coating agent, it is effected in a clean environment, the degree of dust deposition is low, there is neither fear of explosion nor deterioration of environment because there is formed an aqueous layer, and this approach is advantageous also in properties of resulting film, economy and safety.

Because of these advantages, it has been proposed to use a water-soluble or water-dispersible polyurethane as a primer.

For example, U.S. Pat. No. 4755337 discloses a process for producing a polyester film having a primer layer, which comprises coating an aqueous primer coating composition comprising a polyurethane having at least one of a carboxylic acid salt group, a sulfonic acid salt group and a hemisulfate salt group, and a polyepoxy compound on at least one surface of a polyester film before its crystallization and orientation are completed, and thereafter completing the crystallization and orientation by subjecting the coated film to drying, stretching and heat treatment.

A polyester film also has a drawback in that it is electrified easily. For example, the magnetic recording medium using, as its base, a primer-treated polyester film of good adhesivity as mentioned above, is electrified by the static electricity generated during tape running or disc rotation and invites dust deposition thereon and the resultant drop-out of recording and regeneration. Further, in winding-up, rewinding or slitting in the steps of film or magnetic recording medium production, there occur in some cases the emittance of spark from the film caused by peeling and electrification, the breakage of the film caused by electrification and bonding, and so forth. Therefore, particularly the film for magnetic recording media is required to have an antistatic property.

As the method to impart an antistatic property to a magnetic recording medium using a polyester film, there can be mentioned conventional methods such as (1) a method wherein a conductive powder such as carbon powder, metal powder or the like is dispersed uniformly in a magnetic layer, (2) a method wherein an antistatic agent such as surface active agent is compounded into a polyester film by kneading, (3) a method wherein a thin metal layer is formed on a film surface by physical vapor deposition (PVD), and (4) a combination of the above methods. These methods, however, have various problems. For example, the method (1) has problems such as reduction in rentention caused by incorporation of conductive particles into the magnetic layer, resultant reduction in recording density, acceleration of drop-out caused by detachment of conductive particles, and so forth. The method (2) has problems in that the antistatic agent incorporated by kneading does not bleed out easily onto the film surface, the antistatic property of the film surface decreases with the lapse of time, and the surface resistance increases correspondingly therewith. The method (3) has problems in that the adhesion between the film and thin metal layer formed thereon is weak and the thin metal layer is detached during use.

SUMMARY OF THE INVENTION

It is an object of the present invention to provide a coated polyester film having excellent antistatic property, adhesivity and solvent resistance, useful as a base material for highly processed polyester film products such as magnetic tape, floppy disc, X-ray photographic film, telephone card, OHP, base for printing plate and the like.

Another object of the present invention is to provide a preferable process for producing such a surface-treated polyester film.

Other objects and advantages of the present invention will become apparent from the following description.

According to the present invention, there is provided a polyester film having on at least one side, a primer layer comprising a crosslinked product between (a) a polyurethane having $(0.22-33) \times 10^{-4}$ gram equivalent/gram of resin, of at least one functional group selected from a carboxyl group and a salt group derived therefrom and (b) a polyepoxy compound, said crosslinked product containing (c) an antistatic agent composed mainly of a compound represented by the following general formula (I)

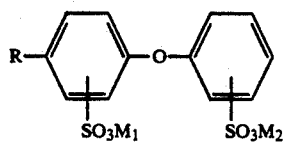

(I)

wherein R represents an alkyl group of 4–20 carbon atoms, and $M_1$ and $M_2$ each represent an alkali metal ion, an ammonium group or a tertiary amino group.

DETAILED DESCRIPTION OF THE INVENTION

In the present invention, the polyester film substrate on which a primer layer is to be formed, includes a film of a linear saturated polyester synthesized substantially from an aromatic dibasic acid or an ester-forming derivative thereof and a diol or an ester-forming derivative thereof. Specific examples of such a polyester are polyethylene terephthalate, polyethylene isophthalate, polybutylene terephthalate, poly(1,4-cyclohexylenedimethylene terephthalate) and polyethylene 2,6-naphthalenedicarboxylate. There are further included their copolymers as well as blends of the above polyester and a small proportion (preferably 5 % by weight or less) of other miscible thermoplastic resin (e.g. polyethylene, polypropylene). Of these polyesters, particularly preferable in the present invention is polyethylene terephthalate.

Such a linear saturated polyester resin is melt extruded to obtain a film according to a conventional method; the film is appropriately oriented and crystallized or crystallized by thermal treatment and then used as a substrate for the surface-treated polyester film of the present invention. Preferably, this polyester film is crystallized and oriented so as to ordinarily have a crystalline heat of fusion of about 4 cal/g or more when measured by a scanning calorimeter in a nitrogen atmosphere at a temperature elevation rate of 10° C./min.

Usually, the polyester film is allowed to contain inorganic or organic inactive fine particles for roughening the film surface, such as those of silica, titanium oxide, aluminum oxide, calcium carbonate, barium sulfate, benzoguanamine or the like, in order to improve the handleability of the polyester film. The addition of such fine particles to the polyester is preferably effected by adding fine particles (preferably in the form of a slurry in glycol) to a reaction system for polyester production, for example at any desired time during an ester exchange reaction or polycondensation reaction when the production is made by an ester exchange method, or at any desired time when the production is made by a direct polymerization method. More preferably, the fine particles are added to the reaction system for polyester production at the initial period of the polycondensation reaction, for example, by the time at which the intrinsic viscosity of the reaction product reaches about 0.3. The inactive fine particles preferably have an average particle diameter of 1 μm or less, particularly 0.1–0.8 μm. The inactive fine particles are used in the polyester in an amount of preferably 0.005–0.6 % by weight, more preferably 0.01–0.3 % by weight based on the weight of the polyester.

According to the present invention, on at least one side of the above polyester film substrate is formed a primer layer comprising a crosslinked product between (a) a polyurethane having a carboxyl group (—COOH) and (or) a salt group derived therefrom (—COOM$_{1/n}$, wherein M represents a cation and n represents a valency of said cation) and (b) a polyepoxy compound, said crosslinked product containing a particular antistatic agent.

Such a polyurethane having a functional group can usually be obtained by using, as one raw material for polyurethane synthesis, a monomer having said functional group, or by utilizing a terminal isocyanate group or other reactive group present in the polyurethane having said group to introduce said functional group into the polyurethane. The above polyurethane for crosslinked product production can be obtained, for example, by effecting polyurethane synthesis using, as one raw material polyhydroxy compound, a polyhydroxy compound having a carboxyl group or a salt group derived therefrom, or by reacting the terminal isocyanate group of a polyurethane with a hydroxyl group-containing carboxylic acid or an amino group-containing carboxylic acid and, as necessary, adding the reaction product to an aqueous base solution under high speed stirring to neutralize part or the whole of the carboxyl group of the reaction product. The amount of carboxyl group or salt thereof (expressed as carboxyl group) in the polyurethane is preferably 0.1–15 % by weight. This amount can be converted to (0.22–33)×10$^{-4}$ gram equivalent/gram of resin. The amount is preferably (0.5–10)×10$^{-4}$ gram equivalent/gram of resin, more preferably (1–5)×10$^{-4}$ gram equivalent/gram of resin. When this amount is too small, the primer layer formed on the polyester film substrate has an insufficient crosslink density owing to the insufficient reaction between the polyurethane and the polyepoxy compound and accordingly has reduced solvent resistance. When said amount is too large, the primer layer has reduced water resistance. The polyurethane has hydrophilicity and can be made into a stable aqueous dispersion or solution by using, as necessary, a dispersing agent. In order to enhance the water dispersibility of the polyurethane, it is possible to introduce into the polyurethane a sulfonic acid salt group, a sulfuric acid half ester group, or the like in a small proportion, in addition to a carboxyl group or a salt group derived therefrom.

As the polyhydroxy compound used for polyurethane synthesis, there can be mentioned, for example, polyethylene glycol, polypropylene glycol, polyethylenepropylene glycol, polytetramethylene glycol, hexamethylene glycol, tetramethylene glycol, 1,5-pentanediol, diethylene glycol, triethylene glycol, polycaprolactone, OH-terminated polyhexamethylene adipate, OH-terminated polyhexamethylene sebacate, OH-terminated polytetramethylene adipate, OH-terminated polytetramethylene sebacate, trimethylolpropane, trimethylolethane, pentaerythritol and glycerine. Of these, particularly preferable are aliphatic polyester polyols such as OH-terminated polyhexamethylene adipate, OH-terminated polyhexamethylene sebacate, OH-terminated polytetramethylene adipate, OH-terminated polytetramethylene sebacate and the like.

Meanwhile, as the polyisocyanate compound, there can be mentioned, for example, hexamethylene diisocyanate, diphenylmethane diisocyanate, tolylene diisocyanate and isophorone diisocyanate, as well as isocyanate-terminated urethane prepolymers such as addition product between tolylene diisocyanate and trimethylolpropane, addition product between hexamethylene diisocyanate and trimethylolethane, and the like. Of these, particularly preferable are aliphatic diisocyanates.

As the carboxylic acid-containing polyol usable as a substitute for part of the polyhydroxy compound, there can be mentioned, for example, dimethylolpropionic acid, dimethylolacetic acid, dimethylolvaleric acid and trimellitic acid-bis(ethylene glycol) ester. As the amino group-containing carboxylic acid to be reacted with the terminal isocyanate group of the isocyanate-terminated urethane prepolymer, there can be mentioned, for example, β-aminopropionic acid, γ-aminobutyric acid and p-aminobenzoic acid. As the hydroxyl group-containing carboxylic acid, there can be mentioned, for example, 3-hydroxypropionic acid, γ-hydroxybutyric acid, p-(2-hydroxyethyl)benzoic acid and malic acid.

The polyurethane synthesis using these raw material compounds can be effected by a well known conventional method such as the one described in, for example, DE No. 1694062. Therefore, detailed description on polyurethane synthesis is not made herein.

Meanwhile, as the base used for neutralization (salt is formed thereby) of the carboxyl group which can be present in the raw material compound or the obtained polyurethane, there can be mentioned, for example, inorganic bases such as sodium hydroxide, potassium hydroxide, ammonium and the like, and organic bases such as aliphatic tertiary amines (e.g. triethylamine, diethylisopropylamine, dimethylethylamine, tri-n-propylamine), diethylamine, triethylamine and the like. Of these, preferable are ammonia which can be vaporized under the drying conditions as mentioned later, and aliphatic tertiary amines.

The polyurethane used in the present invention can have a number-average molecular weight in the range of generally 10,000–500,000, preferably 20,000–200,000.

Meanwhile, the polyepoxy compound used as a crosslinking agent for the functional group-containing polyurethane is a compound having at least 2, preferably 2–5 epoxy groups in the molecule. In the present invention, an aliphatic polyepoxy compound having good water solubility is particularly suitable, and such a polyepoxy compound can have epoxide equivalents in the range of generally 100–600, preferably 100–300, more preferably 110–200 g/gram equivalent.

Specific examples of such a polyepoxy compound include the following:

(1)

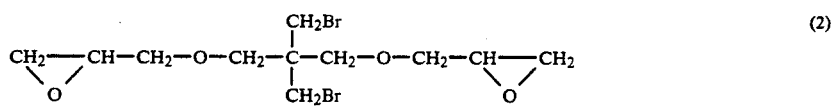

(2)

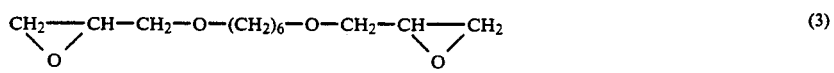

(3)

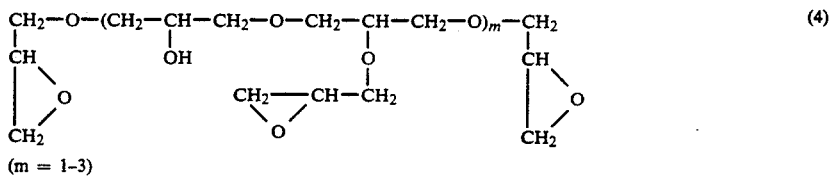

(m = 1–3)

(4)

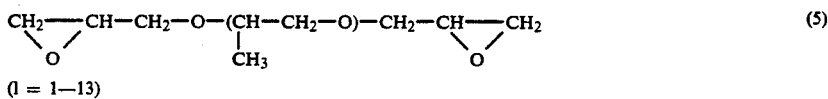

(l = 1—13)

(5)

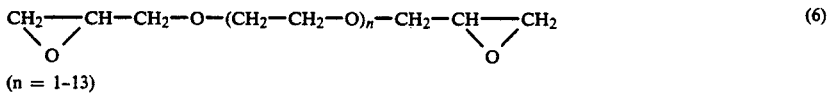

(n = 1-13)

(6)

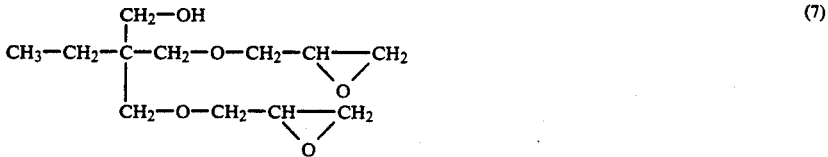

(7)

-continued

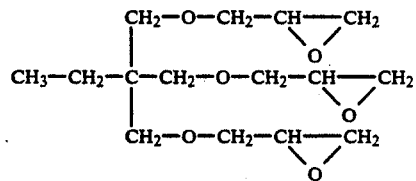  (8)

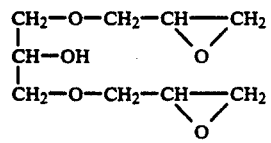  (9)

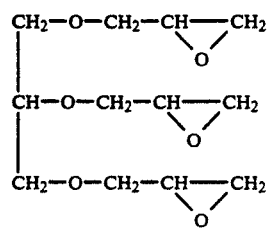  (10)

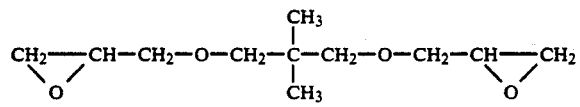  (11)

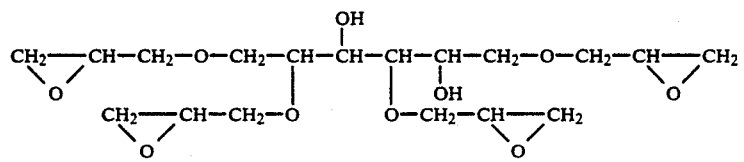  (12)

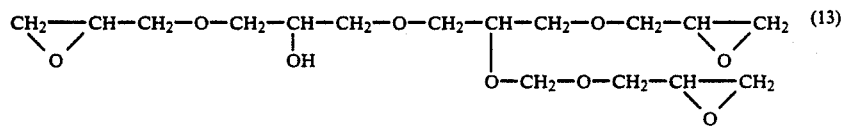  (13)

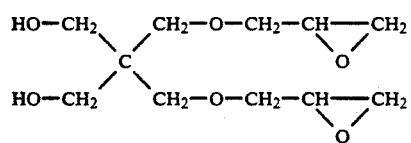  (14)

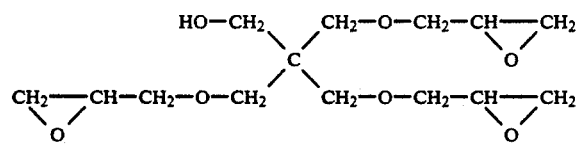  (15)

glycidylamine compound having a tertiary amine group in the molecule, and water-soluble or water-dispersible epoxy compounds such as addition condensate between bisphenol A and epichlorohydrin, and the like.

Of these polyepoxy compounds, preferable are compounds represented by the formulas (4), (8), (9), (10), (12), (13) and (15).

In the present invention, the antistatic agent used in the crosslinked product between the functional group-containing polyurethane and the polyepoxy compound is composed mainly of a compound represented by the following general formula (I).

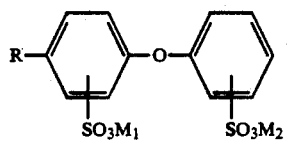  (I)

In the above formula, R is an alkyl group of 4–20 carbon atoms, particularly preferably an alkyl group of 6–12 carbon atoms; $M_1$ and $M_2$ are each an alkali metal ion, an ammonium group or a tertiary amino group. As the alkali metal ion, there can be mentioned, for example, lithium ion, sodium ion and potassium ion. As the tertiary amino group, there can be mentioned, for example, a triethylamino group. Of these, preferable are sodium ion, potassium ion and an ammonium group.

Specific examples of the above compound (I) include a compound represented by the following general formula (II)

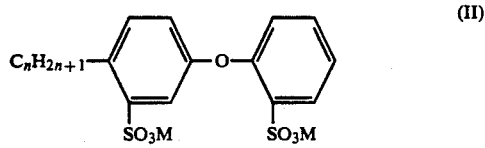

wherein n=6-12 and M=Na+, K+ or —NH4+. More specific examples of the compound (II) include sodium dodecyl diphenyl ether disulfonate, potassium dodecyl diphenyl ether disulfonate, ammonium dodecyl diphenyl ether disulfonate, sodium octyl diphenyl ether disulfonate, potassium octyl diphenyl ether disulfonate and ammonium octyl diphenyl ether disulfonate. The compounds of formula (I) can be used either singly or in combination.

Especially, in this invention, in order to suppress foaming of an aqueous coating composition to be described later in forming a primer layer on a polyester film with said composition by roll coating or gravure coating, the compound of formula (I) and a sulfonate-terminated ethylene oxide-propylene oxide copolymer are conjointly used as an anti-foaming agent. Thereby, not only can the productivity of the coated film be greatly improved, but also properties of the resulting coated film, such as uniformity of a coated surface and uniform adhesivity, can be increased.

The sulfonate-terminated ethylene oxide-propylene oxide copolymer includes a copolymer represented by the following general formula (III)

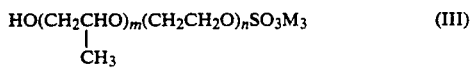

wherein $M_3$ represents an alkali metal (e.g., Na, K and Li), an ammonium salt group ($NH_4$) or a quaternary ammonium salt group (e.g., a group of a salt of a tertiary amine such as trimethylamine, triethylamine or dimethylethanolamine ), m is a number of 7 to 450, preferably 8 to 360, and n is a number of 8 to 90, preferably 24 to 70. Concrete examples thereof are Sunnol PP-2030 and Sunnol P-3030 which are commercially available from Lion Corp.

Generally, the proportions of polyurethane, polyepoxy compound and antistatic agent used are 40-80 % by weight, 1-30 % by weight and 5-40 % by weight, respectively, when the total of the three components is 100 % by weight, although the proportions can be varied depending upon the crosslinking degree required for the primer layer, the amount of functional group in the polyurethane, the epoxide equivalent of the polyepoxy compound, the antistatic agent used, etc. When the proportion of polyurethane is too small, the resulting primer layer has low adhesivity to the polyester film substrate. When the proportion is too large, the primer layer has low anti-blocking property and slipperiness. When the proportion of polyepoxy compound is too small, the resulting primer layer is too soft and has low anti-blocking property and slipperiness. When the proportion is too large, the primer layer is too hard and has low adhesivity particularly to a magnetic layer to be formed thereon. When the proportion of antistatic agent is too small, the resulting primer layer has low antistatic property, reducing the handleability of the resulting polyester film. When the proportion is too large, the primer layer causes swelling and has low slipperiness.

The proportion of the sulfonate-terminated ethylene oxide-propylene copolymer is not strictly limited and can vary properly with its type, the type of the compound of formula (I) and/or its use amount. It is advisable that said proportion is usually 0.25 to 2 parts by weight, preferably 0.25 to 1 part by weight.

The primer layer according to the present invention can be formed by coating on at least one side of the above-mentioned polyester film, a liquid mixture comprising the functional group-containing polyurethane, the polyepoxy compound and the antistatic agent composed mainly of the compound represented by the general formula (I), then subjecting the coated polyester film to crosslinking and curing.

The liquid mixture may be a solvent type coating composition using an organic solvent, but is preferably an "aqueous type" coating composition obtained by dissolving or dispersing necessary components in an aqueous medium by utilizing the properties of the functional group of the polyurethane.

Such an aqueous coating composition can be prepared by dissolving and/or dispersing a polyurethane having a salt group derived from carboxyl group, a polyepoxy compound, an antistatic agent composed mainly of a compound represented by the general formula (I) and a sulfonate-terminated ethylene oxide-propylene oxide copolymer, in an aqueous medium, or by adding a polyurethane having a carboxyl group, a polyepoxy compound, an antistatic agent composed mainly of a compound represented by the general formula (I) and a sulfonate-terminated ethylene oxide-propylene oxide copolymer, to an aqueous medium, neutralizing the carboxyl group of the polyurethane with the above-mentioned base, and thereby dissolving and/or dispersing the neutralized polyurethane, the polyepoxy compound, the antistatic agent composed mainly of the compound represented by the formula (I) and the sulfonate-terminated ethylene oxide-propylene oxide copolymer, in the aqueous medium.

To the aqueous coating composition is preferably added a compound for accelerating the crosslinking reaction between the polyurethane and the polyepoxy compound (in the present specification, said compound is referred to as "reaction-accelerating compound"). The reaction-accelerating compound includes basic tertiary amino group-containing compounds and their salts, tertiary nitrogen-containing heterocyclic compounds and their salts, quaternary ammonium salt compounds, etc. Specific examples of the basic tertiary amino group-containing compounds are aliphatic tertiary amines such as trimethylamine, triethylamine, tri-n-butyl-amine and the like; and aromatic tertiary amines such as dimethylaminobenzene, benzyldimethylamine, 2,4,6-tris-(dimethylaminomethyl)phenol and the like. As the tertiary nitrogen-containing heterocyclic compounds and their salts, there can be mentioned, for example, imidazole compounds such as 2-methylimidazole, 2-methyl-4-ethylimidazole, 2-ethylimidazole, 2-isopropylimidazole, 2-phenyl-4-methylimidazole and the like; 1,8-diazabicyclo[5.4.0]undecene-7; and their hydrochlorides and carbonates. As the quaternary ammonium salt compounds, there can be mentioned, for example, triethylbenzylammonium chloride and tetramethylammonium chloride. Of these, preferable are basic tertiary amino group-containing compounds and tertiary nitrogen-containing heterocyclic compounds; specifically, aromatic tertiary amines and imidazole compounds are preferable.

These reaction-accelerating compounds are used in a proportion of preferably 5-50 % by weight, more preferably 10-50 % by weight based on the weight of the polyepoxy compound.

The above prepared aqueous coating composition is preferably coated on at least one side of a polyester film whose crystallization and orientation are not completed (this coating is generally called "in-line coating"). In this case, the preferable solid content of the aqueous coating composition is usually 30 % by weight or less, preferably 15 % by weight or less, more preferably in the range of 0.5-10 % by weight. The suitable viscosity of the aqueous coating composition is 100 cp or less, preferably 20 cp or less. The preferable amount of the composition coated is about 0.5-20 g, preferably 1-10 g per $m^2$ of polyester film substrate, and about 0.001-1 g, preferably 0.002-0.5 g, particularly preferably 0.01-0.3 g per $m^2$ of one side of biaxially stretched polyester film obtained finally. In other words, the aqueous coating composition is suitably coated so as to finally give a primer layer having a thickness of about 0.001-1 $\mu$m, preferably 0.002-0.5 $\mu$m, particularly preferably 0.01-0.3 $\mu$m.

Herein, the polyester film whose crystallization and orientation are not completed, includes an unstretched film obtained by heat-melting a polyester and extruding the molten polyester into a film form; a monoaxially stretched film obtained by orienting an unstretched film in one direction (lengthwise direction or crosswise direction); a film obtained by stretching and orienting a polyester in two (lengthwise and crosswise) directions in low draw ratios (this is a biaxially stretched film before it is finally stretched again in lengthwise and crosswise directions to complete orientation and crystallization); and so forth. Of these, a lengthwise monoaxially stretched film is preferable. In order to enable the uniform coating of the composition on the polyester film substrate, it is possible to apply, before coating, a corona discharge treatment as a pretreatment to the substrate surface.

The coating of the aqueous coating composition can be effected by any known conventional method such as roll coating, gravure coating, roll brush coating and the like. These methods can be used alone or in combination.

The polyester film coated with the aqueous coating composition is introduced into steps such as drying, stretching and thermal fixing. For example, the lengthwise monoaxially stretched polyester film coated with the aqueous coating composition is introduced into a stenter to undergo crosswise stretching and thermal fixing. During this period, the composition coated on the polyester film is dried and further allowed to cause a crosslinking reaction, to form a continuous film on the film. The heat necessary for the crosslinking reaction is usually given by the heat supplied for stretching or thermal fixing, and its temperature is generally 180-250° C. The heating time is dependent upon the temperature used, and is, for example, about 8 seconds at 220° C. and about 10 seconds at 200° C. The heating may be effected under milder or severer conditions than the above. The primer composition according to the present invention has advantages that it has excellent coatability and, when coated, gives a sufficient crosslink density by a treatment such as drying or the like and can reliably form a primer layer of excellent antistatic property, excellent adhesivity and good solvent resistance.

The stretching, thermal fixing, etc. for causing the orientation and crystallization of the polyester film can be effected under, for example, the conditions conventionally known in the relevant field.

The polyester film having a particular primer layer thereon, provided by the present invention has excellent antistatic property and adhesivity, shows high adhesivity to a very wide range of coatings such as cellophane ink, UV ink, UV coating, magnetic coating, gelatin composition, toner composition for electrophotography, chemical mat coating and the like, and is superior in running stability during coating. Further, said film shows excellent solvent resistance to organic solvents such as methyl ethyl ketone, toluene, ethyl acetate, butyl acetate, ethanol, dioxane, tetrahydrofuran, cyclohexanone, cyclohexane and the like.

Furthermore, the above polyester film having a particular primer layer has excellent antiblocking property under high temperatures and high humidities, and shows a blocking strength of generally 15 g/5 cm or less, preferably 10 g/5 cm or less when measured by a method to be described later.

Further, according to this invention, the sulfonate-terminated ethylene oxide-propylene oxide copolymer of formula (III) is added as an anti-foaming agent. Therefore, when the coating composition is continuously coated on a polyester film by roll, coating or gravure coating for a long period of time, little foaming occurs in a coating bath, coating unevenness by foaming does not happen, and a long-term continuous coating operation becomes possible, making it possible to greatly improve productivity of the coated film.

The polyester film having a particular primer layer according to the present invention includes a polyester film having the primer layer on one side of the film and a polyester film having the primer layer on both sides of the film. The polyester film having the primer layer on one side of the film is suitable as a base film for telephone card, orange card (trade name), etc. when the other side of the film is coated with a coating of easy printability, and is further suitable as a base film for magnetic tapes such as video tape, audio tape and the like. The polyester film having the primer layer on both sides of the film is useful as a base film for floppy disc. Said polyester film, when used as a base film for floppy disc, desirably has a Ra (surface roughness at center line) of 0.02 $\mu$m or less, preferably 0.005-0.012 $\mu$m.

The Ra used herein is measured in accordance with JIS B 0601. That is, using a contact needle type surface roughness tester (SURFCOM3B manufactured by Tokyo Seimitsu), a chart (film surface roughness curve) is written under conditions of needle radius $=2$ $\mu$ and load $=0.07$ g; from the film surface roughness curve is extracted a portion of a measurement length L along the center line; when the center line of the extracted portion is taken as X axis, the direction of lengthwise stretching is taken as Y axis, and the roughness curve is expressed by $Y = f(X)$, the value (Ra) given by the following formula is defined as film surface roughness.

$$Ra = \frac{1}{L} \int_0^L |f(x)| dx$$

In the present invention, 8 measurements are made by using 0.25 mm as a standard length, and an average of 5 smaller measurements (3 larger measurements are discarded) is taken as Ra.

The polyester film having a primer layer according to the present invention is suitable particularly as a base film for magnetic recording materials. A magnetic recording layer can be formed on the primer layer of the present polyester film, according to the techniques conventionally known in the relevant field. In general, the magnetic layer comprises a binder (organic high-molecular compound), a magnetic powder, a lubricant, an antistatic agent, an abrasive, a dispersing agent, etc. As the binder, there are used, for example, thermoplastic resins such as vinyl chloride-vinyl acetate copolymer, polyurethane resin, nitrocellulose, saturated polyester resin and the like; thermosetting resins such as epoxy resin, a combination of a thermoplastic resin and a crosslinking agent (e.g. polyisocyanate compound) and the like; and polyfunctional acrylates which are crosslinked by heat, actinic rays, electron rays, etc. As the magnetic powder, there are used acicular fine particles of $-Fe_2O_3$, $Co--Fe_2O_3$, $CrO_2$, Fe, barium ferrite or the like. As the lubricant, there are used silicone oil, carbon, graphite, various fatty acids and fatty acid esters, etc. As the antistatic agent, there are used carbon black, etc. As the abrasive, there are used mainly $Al_2O_3$, $Cr_2O_3$, etc. Besides, as the dispersing agent, there are used lecithin, surface active agents, etc.

The present invention is described in more detail below by way of Examples. In the Examples, "parts" refer to "parts by weight", and film properties were measured by the following methods.

1. Adhesivity

A coating for evaluation purpose was roll-coated on a polyester film. The coated film was dried at 80° C. for 1 minute and then aged at 60° C. for 24 hours to form a coating layer of average 2 μm in thickness. The resulting coated film was subjected to abrasion by a RCA abrasion tester manufactured by RCA under a head load of 50 g to measure the times of abrasion until a hole was formed on the coated surface. The times were taken as a yardstick of the adhesivity of the polyester film.

PREPARATION OF COATING FOR EVALUATION PURPOSE

In a lacquer thinner for coating was dissolved Nitrocellulose RS 1/2 (flakes containing 25 % of isopropanol, manufactured by Daicel) to prepare a 40 wt. % solution. In a ball mill were placed 43.9 parts of this solution, 32.5 parts of a polyester resin (Desmophen #1700 manufactured by Bayer), 2.60 parts of a magnetic powder of chromium dioxide, and as a dispersing agent and a wetting agent, 1 part of a soybean oil fatty acid (Lecion P manufactured by Riken Vitamine), 0.5 part of a cationic active agent (Cation AB manufactured by NIPPON OIL & FATS CO., LTD.) and 0.8 parts of squalene (shark liver oil). There was further added 282 parts of a mixed solution consisting of methyl ethyl ketone/cyclohexanonetoluene =3/4/3 (weight ratio). The resulting mixture was thoroughly milled to prepare a pre-final coating solution (45 wt. %). To 50 parts of this pre-final solution were added 48 parts of an addition reaction product (Coronate L manufactured by Nippon Polyurethane Kogyo) between trimethylolpropane and toluene diisocyanate and 6.25 parts of butyl acetate, to finally obtain a magnetic coating for evaluation purpose having a solid content of 42.75 wt. %.

2. Surface resistance

A polyester film was allowed to stand for 24 hours under conditions of 20° C.×65 % R.H. and then measured by a vibrating capacitor type potentiometer (TR-84M manufactured by Takeda Riken).

3. Blocking strength

The coated surfaces of two same polyester films were contacted with each other. The resulting laminate was cut into a size of 5 cm×10 cm. This test piece was allowed to stand for 17 hours under a load of 6 kg/cm² in an atmosphere of 60° C.×80 % R.H., and measured for peeling strength. A smaller value shows a better result in blocking strength.

4. Height of foaming 3362 according to a Rass and Mils method, a height of foaming was measured which was given when 15 minutes passed after 50 ml of a solution in a pipet flowed out.

5. Continuous coatability

A polyester film 500 mm wide and 25 micrometers thick was caused to run at a rate of 50 m/min and subjected to continuous coating in a coating amount (wet) of 8 g/m² using a 150-mesh gravure roll having a diameter of 150 mm. A 3-meter long coated film was sampled at every 15 minutes. In the resulting sample, streaks on the coating surface owing to the foaming were checked. A time when two or more streaks occurred was made a limit of the continuous coating. Continuous coatability is indicated by a time (hr) that lapsed until said limit was reached.

EXAMPLE 1

58 parts (as non-volatile component) of an aqueous dispersion of a polyurethane having a salt of carboxyl group at the molecule side chain [Melusi 585 (trade name) manufactured by Toyo Polymer, molecular weight=40,000, amount of carboxyl group=$3 \times 10^{-4}$ gram equivalent/gram of resin], 10 parts of tetraglycidyl sorbitol (epoxide equivalent=172 g/gram equivalent), 2 parts of 2,4,6-tris(dimethylaminomethyl)phenol, and as an antistatic agent, 20 parts of sodium dodecyl diphenyl ether disulfonate and 10 parts of sodium sulfonate terminated ethyleneoxide and propyleneoxide copolymer [Sunnol PP-2030 manufactured by Lion Corp.] were diluted with deionized water to prepare an aqueous primer coating solution having a solid content of 4 wt. %.

A polyethylene terephthalate (containing a filler) having an intrinsic viscosity of 0.60 as measured for an o-chlorophenol solution of 25° C., was melt-extruded on a rotating cooling drum maintained at 20° C. to obtain an unstretched film of 950 μm in thickness. The film was stretched 3.5 times in a machine-axial direction. On the one side of the resulting monoaxially stretched film was coated the above coating solution by a gravure coating method. The average amount coated was 80 mg/m² (as solid content) per one side. Then, the coated film was stretched 3.9 times crosswise at 105° C., followed by heat treatment at 210° C. to obtain a one side primer-coated biaxially oriented polyester film having a thickness of 75 μm and a Ra of 0.009 μm.

The film was evaluated for various properties.

EXAMPLE 2

A primer-coated polyester film was obtained in the same manner as in Example 1 except that the aqueous polyurethane resin used in Example 1 was replaced by Neorez R-966 (trade name) manufactured by Polyvinyl Chemical (molecular weight=200,000, amount of carboxyl group=$1.4 \times 10^{-4}$ gram equivalent/gram of resin).

The film was evaluated for various properties.

COMPARATIVE EXAMPLE 1

For comparison, a polyethylene terephthalate film having a thickness of 75 μm, coated with no primer solution was evaluated for various properties.

EXAMPLE 3

A primer-coated polyester film was obtained in the same manner as in Example 1 except that the tetraglycidyl sorbitol (polyepoxy compound) used in Example 1 was replaced by triglycidyl glycerol (epoxide equivalent=146 g/gram equivalent).

The film was evaluated for various properties.

EXAMPLE 4 AND 5

Two primer-coated polyester films were obtained in the same manner as in Example 1 except that the amount ratio of sodium dodecyl diphenyl ether disulfonate/Sunnol PP-2030 used in Example 1 was changed to 16 parts/14 parts (Example 4) or 24 parts/6 parts (Example 5).

These films were evaluated for various properties.

EXAMPLE 6

A primer-coated polyester film was obtained in the same manner as in Example 1 except that the amount ratio of the polyuethane resin/tetraglycidyl sorbitol/2,4,6-tris(dimethylaminomethyl)phenol/sodium dodecyl diphenyl ether disulfonate/Sunnol PP-2030 used in Example 1 was changed to 62 parts/10 parts/3 parts/ 19 parts/6 parts.

The film was evaluated for various properties.

COMPARATIVE EXAMPLE 2

85 parts (as non-volatile component) of an aqueous dispersion of a polyurethane having a salt of carboxyl group at the molecule side chain [Meluci 585 (trade name) manufactured by Toyo Polymer, molecular weight=40,000, amount of carboxyl group=$3 \times 10^{-4}$ gram equivalent/g of resin]and 15 parts of a polyoxyethylene nonyl phenyl ether [NS 208.5 (trade name) manufactured by NIPPON OIL & FATS CO., LTD.]were diluted with deionized water to prepare an aqueous primer coating solution having a solid content of 4 wt. %.

A primer-coated polyester film was obtained in the same manner as in Example 2 except that the above aqueous primer coating solution was used as a primer coating solution.

The film was evaluated for various properties.

EXAMPLE 7

A primer-coated polyester film was obtained in the same manner as in Example 1 except that the sodium dodecyl diphenyl ether disulfonate used in Example 1 was replaced by sodium octyl diphenyl ether disulfonate.

The film was evaluated for various properties.

COMPARATIVE EXAMPLE 3

78 parts (as non-volatile component) of an aqueous dispersion of a polyurethane having a carboxylic acid amine base group [Meluci 545 (trade name) manufactured by Toyo Polymer, aliphatic polyester polyurethane, molecular weight=about 40,000, amount of functional group=$3 \times 10^{-4}$ gram equivalent/g], 10 parts of a polyoxyethylene nonyl phenyl ether [NS-240 (trade name) manufactured by NIPPON OIL & FATS CO., LTD., $C_9H_{19}C_6H_4-O-(CH_2CH_2O)_n-H$ (n=about 40)], 10 parts of a polyfunctional epoxy compound [Meluci AD-C-65 (trade name) manufactured by Toyo Polymer, epoxide equivalent=170 g/gram equivalent]and 2 parts of 2,4,6-tris(dimethylaminomethyl)phenol were diluted with deionized water to prepare an aqueous primer coating solution having a solid content of 4 wt. %.

A primer-coated polyester film was obtained in the same manner as in Example 1 except that the above aqueous primer coating solution was used as a primer coating solution.

The film was evaluated for various properties.

COMPARATIVE EXAMPLE 4

Example 1 was repeated except that 10 parts of sodium sulfonate-terminated ethylene oxide and propylene oxide copolymer was not used, and 30 parts rather than 20 parts of sodium dodecyl diphenyl ether disulfonate was used.

The film was evaluated for various properties.

COMPARATIVE EXAMPLE 5

Example 1 was repeated except that 20 parts of sodium alkylsulfonate and 10 parts of a polyoxyethylenenonylphenyl ether were used instead of 20 parts of sodium dodecyl diphenyl ether disulfonate and 10 parts of a sodium sulfonate-terminated ethylene oxide and propylene oxide copolymer.

The film was evaluated for various properties. The results are shown in Table 1.

TABLE 1

| | Adhesivity (times) | Surface resistance (Ω/□) | Blocking strength (g/5 cm) | Height of foaming (mm) | Continuous coatability (hr) |
|---|---|---|---|---|---|
| Example 1 | 10 | $9 \times 10^{11}$ | 5 | 105 | 15 |
| Example 2 | 8 | $8 \times 10^{11}$ | 6 | 107 | 15 |
| Example 3 | 10 | $6 \times 10^{11}$ | 4 | 100 | 20 |
| Example 4 | 9 | $1 \times 10^{12}$ | 5 | 83 | >24 |
| Example 5 | 9 | $1 \times 10^{11}$ | 5 | 114 | 16 |
| Example 6 | 12 | $4 \times 10^{12}$ | 3 | 110 | 16 |
| Example 7 | 9 | $6 \times 10^{12}$ | 9 | 98 | 21 |
| Comparative Example 1 | 2 | $>10^{16}$ | 0 | — | — |
| Comparative | 9 | $>10^{16}$ | 30 | 90 | >24 |

TABLE 1-continued

| | Adhesivity (times) | Surface resistance (Ω/□) | Blocking strength (g/5 cm) | Height of foaming (mm) | Continuous coatability (hr) |
|---|---|---|---|---|---|
| Example 2 Comparative Example 3 | 9 | 3 × 10¹⁶ | 5 | 50 | >24 |
| Comparative Example 4 | 9 | 5 × 10¹¹ | 6 | 160 | 3 |
| Comparative Example 5 | 10 | 1 × 10¹² | 13 | 183 | 4 |

As is clear from Table 1, the primer-coated polyester films of the present invention have excellent antistatic property and adhesivity and also have good blocking property.

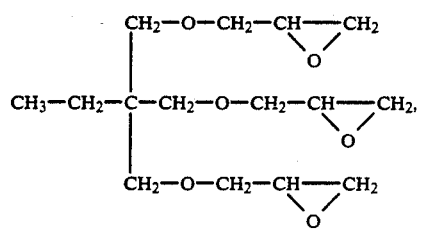

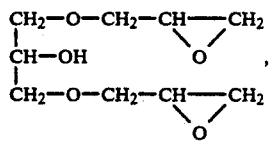
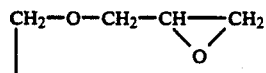
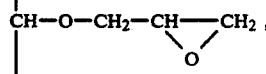
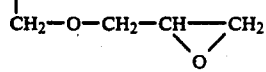
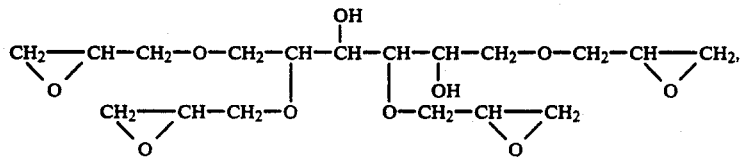
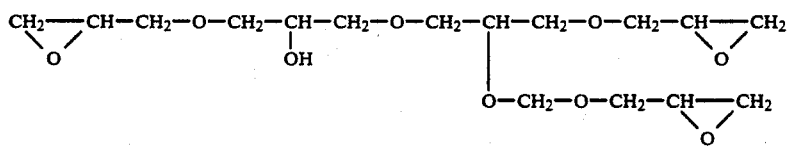
and
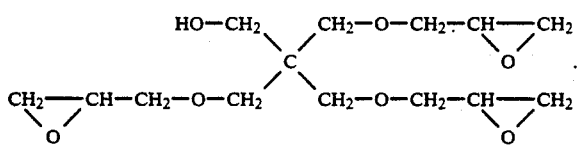

We claim:

1. A polyester film having on at least one side, a primer layer comprising a crosslinked product between (a) a polyurethane having $0.22 \times 10^{-4}$ to $33 \times 10^{-4}$ gram equivalent/gram of resin, of at least one functional group selected from the group consisting of a carboxyl group and a salt group derived therefrom and (b) a polyepoxy compound, said crosslinked product containing (c) an antistatic agent composed mainly of a compound represented by the following general formula (I)

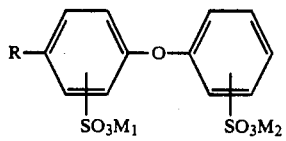

(I)

wherein R represents an alkyl group of 4-20 carbon atoms, and $M_1$ and $M_2$ each represent an alkali metal ion, an ammonium group or a tertiary amino group and (d) a sulfonate-terminated ethylene oxide-propylene oxide copolymer, wherein the proportions of the polyurethane, the polyepoxy compound an the antistatic agent are 40-80% by weight, 1-30% by weight and 5-40% by weight, respectively, where the total of these three components is 100% by weight; and the proportion of the sulfonate-terminated ethylene oxide-propylene oxide copolymer is 0.25 to 2 parts by weight per part by weight of the compound of formula (I).

2. The film of claim 1 wherein the polyurethane has a number-average molecular weight in the range of 10,000-500,000.

3. The film of claim 1 wherein the polyurethane is a polyurethane obtained by introducing a salt of carboxyl group into a polyurethane formed form an aliphatic polyester polyol and an aliphatic diisocyanate.

4. The film of claim 1 wherein the polyepoxy compound is a water-soluble aliphatic polyepoxy compound having an epoxide equivalent in the range of 100-600 g/gram equivalent.

5. The film of claim 1 wherein the antistatic agent is a compound represented by the following general formula (II)

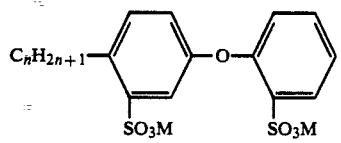

(II)

wherein $n=6\text{-}12$ and $M=Na^+$, $K^+$ or $-NH_4^+$.

6. The film of claim 1 wherein the sulfonate-terminated ethylene oxide-propylene oxide copolymer is a copolymer represented by the following general formula (III)

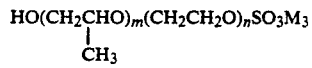

(III)

wherein $M_3$ represents an alkali metal, an ammonium salt group or a quaternary ammonium salt group, m is a number of 7 to 450, and n is a number of 8 to 90.

7. The film of claim 1 wherein the primer layer has a thickness in the range of 0.002-0.5 micrometer.

8. The film of claim 1 wherein the polyepoxy compound is selected from the group consisting of

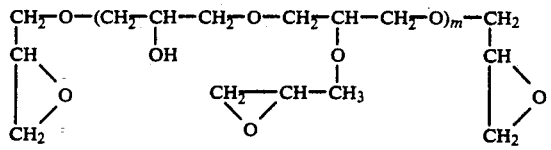

where $m=1-3$,